INVENTOR.
DANIEL G. RUSS
BY Wiessler
ATTORNEY

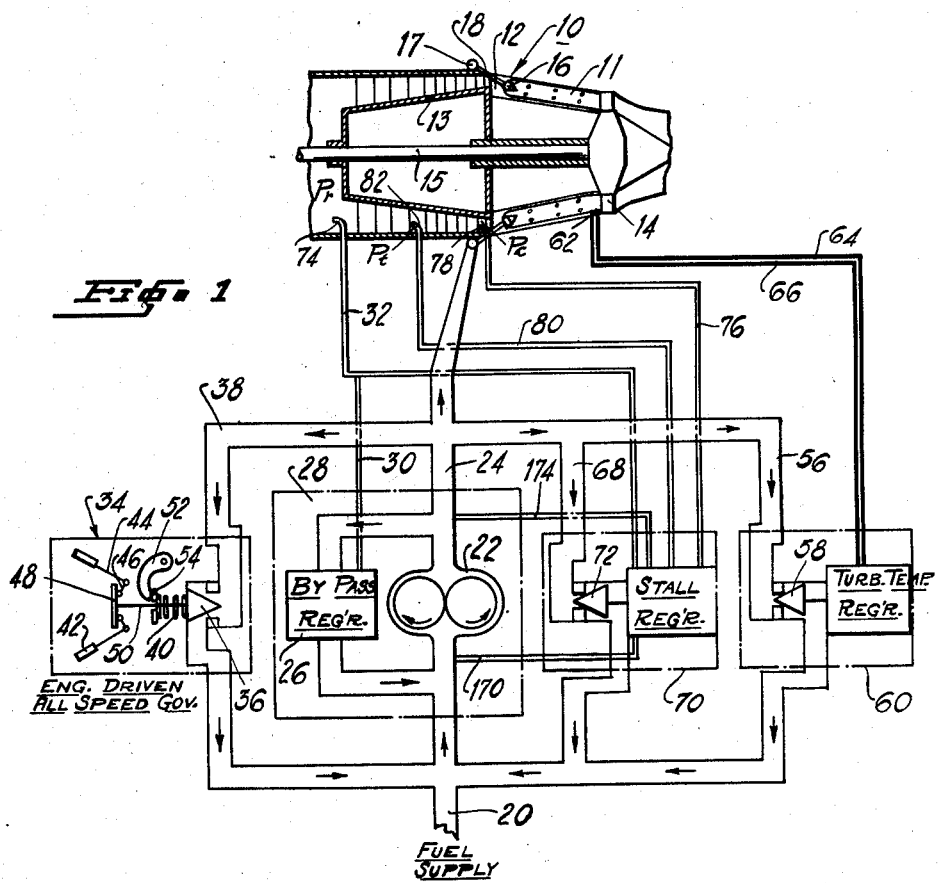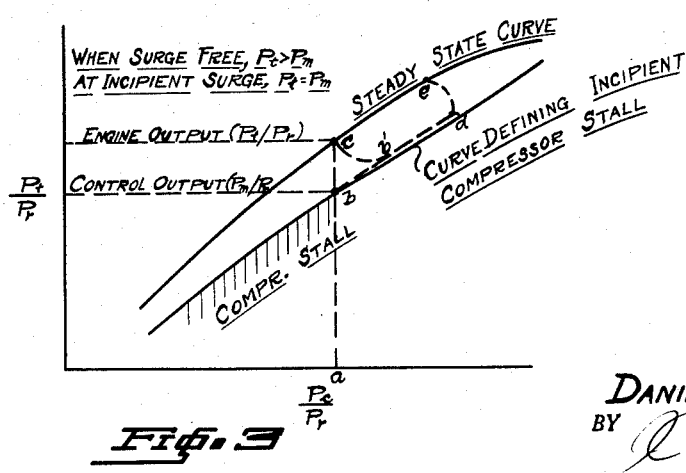

United States Patent Office 2,947,141
Patented Aug. 2, 1960

2,947,141

FUEL FEED AND POWER CONTROL SYSTEM FOR GAS TURBINE ENGINES

Daniel G. Russ, South Bend, Ind., assignor to Bendix Aviation Corporation, South Bend, Ind., a corporation of Delaware Filed Jan. 4, 1954, Ser. No. 401,989

23 Claims. (Cl. 60—39.28)

This invention relates to a fuel feed and power control system for gas turbine engines and more particularly for gas turbine engines adapted for the propulsion of aircraft, such as those now commonly known as turbo-jet and turbo-prop engines.

In acceleration of gas turbine engines a phenomenon known as compressor stall or surge may be encountered in which the pressure ratio of the compressor exceeds some critical value at any given speed, which usually results in a sudden and drastic reduction of compressor pressure ratio and air flow delivered, and/or in sustained pulsations of these quantities. If such a condition is encountered, the burner temperatures and the vibratory stresses induced in the compressor bay become sufficiently high to cause serious damage to the engine unless the condition is alleviated by suitable power control action, such as by an immediate and sharp reduction in the fuel delivery to the engine. In many present day high compression, high efficiency gas turbine engines it has been found that the stall or surge characteristic of the engine compressor requires limiting the fuel flow supplied to the engine throughout the greater part of the range of acceleration. Many of the fuel controls now in use on such engines include a mechanism which schedules the fuel flow during acceleration such that the compressor stall region for the particular engine is avoided. Experience in this art, however, has been such, that in order to avoid the compressor stall region during engine acceleration by means of a relatively simple control system, a substantial safety margin must be provided which necessarily decreases the rate at which the engine can be accelerated, particularly since the compressor stall region varies over a relatively wide range with variations in engine operating conditions. On the other hand, some controls have been designed which may more closely meet the compressor limitations but which are of such inherent complexity as to make them impractical for commercial use or involve great difficulties in manufacture, maintenance, dependability of operation, and the like.

In addition, stall fuel controls of the scheduling type, wherein a predetermined acceleration schedule of fuel flow to the engine for each engine operating condition is built into the control, do not take into consideration certain factors such as variations in engine combustion efficiency, changes in the characteristics of the fuel being burned such as in heating value, density, and viscosity, bleed off at the discharge of the compressor or battle damage to the combustion apparatus, and variations in operating characteristics from one engine to another due to differences attributable to engine components other than the compressor. One of the basic requirements of any such control is to meter fuel during acceleration of the engine until limited by a stall relation which is independent of the above noted effects; such a relation is an inherent compressor characteristic at stall. My invention is an improvement of the invention disclosed in my copending application Serial No. 219,303, filed April 4, 1951, now Patent No. 2,693,081, and satisfies this basic requirement by providing a compressor stall fuel control which varies the flow of fuel to the engine so as to maintain a relation denotable as $$\frac{P_t}{P_r} = f\left(\frac{P_c}{P_r}\right)$$

or $$P_t = P_r \cdot f\left(\frac{P_c}{P_r}\right)$$

where $P_r$ denotes compressor inlet pressure, $P_c$ denotes compressor discharge pressure, $P_t$ represents a general total pressure which is selectably independent of $P_c$ and $P_r$ and which may be obtained by a pressure probe at any selected stage of the compressor such that $$\left(\frac{P_t}{P_r}\right)$$

represents a predetermined function of corrected engine speed or corrected air flow or some composite function of air flow and speed depending on the selected position of the $P_t$ pressure probe, and $f$ denotes a predetermined functional relationship between the terms of this relation which may be experimentally determined for any given engine to reflect the compressor stall characteristic of that engine as illustrated on the curve chart of Figure 3.

My stall control is designed to compute a modulated pressure $P_m$ which is at all times equal to $$P_r \cdot f\left(\frac{P_c}{P_r}\right)$$

and which compares this modulated pressure with the engine output or response pressure $P_t$ to regulate the flow of fuel to the engine during acceleration thereof so that stall-free operation is insured along a regulated fuel flow characteristic which substantially matches the incipent stall characteristic of the compressor. The stall control is constructed in such a manner that $P_t$ directly opposes $P_m$ to control the position of a by-pass type stall fuel valve. Under normal operating conditions $P_t$ is greater than $P_m$ which is a condition of stall-free operation; incipient stall is indicated when $P_t$ equals $P_m$. If, following a throttle burst, $P_t$ becomes equal to $P_m$ incipient stall is indicated and the stall fuel valve will by-pass fuel so that the fuel flow to the engine is regulated along a schedule which just skirts the compressor stall limit and prevents undesirable engine operation.

It is therefore one of the primary objects of this invention to provide a stall regulator in a fuel control system for gas turbine engines which will permit a substantially optimum rate of acceleration without stall throughout the operating range of the engine.

Another important object of this invention is to provide a compressor stall regulator control for engines of the type specified wherein a fuel valve regulates the flow of fuel to the engine in such a manner that a control computed modulated pressure, which is indicative of compressor stall, is maintained at a value equal to or less than an engine response pressure.

A further object of this invention is to provide a relatively simple fuel flow regulating means for engines of the type specified wherein fuel flow to the engine is controlled in accordance with the relation $$P_t = P_r \cdot f\left(\frac{P_c}{P_r}\right)$$

where $P_r$ denotes compressor inlet pressure, $P_c$ denotes compressor discharge pressure, $P_t$ represents a compressor total pressure selectably independent of $P_c$ and $P_r$ so as to represent a tangential, axial or composite pressure sensed in any suitable compressor stage, and $f$ denotes a predetermined compressor stall function, A further object of this invention is to provide a fuel flow regulator for gas turbine engines which functions to control the flow of fuel to the engine independently of variations in engine combustion efficiency, changes in the characteristics of the fuel being burned, bleed off at the discharge of the compressor, and general variations in engine components other than the compressor, which result from deterioration, battle damage, or manufacturing tolerances and the like.

Another object of this invention is to provide a fuel control system for gas turbine engines which is adapted to meter fuel during acceleration of the engine at a rate which closely follows the stall characteristic of the compressor at all engine operating conditions without the necessity of sensing that temperature condition according to which said compressor stall characteristic varies.

An additional object of this invention is to provide a fuel control system for gas turbine engines which may be easily adapted to meter fuel to any given engine as a function of a certain engine operating parameter uniquely definitive of the compressor stall characteristic at all engine operating conditions.

A further object of this invention is to provide a fuel flow regulator for gas turbine engines wherein a flow regulating valve controls the flow of fuel to the engine in response to a comparison between a modulated pressure which is controlled by a pressure generator to vary as compressor inlet pressure times a predetermined function of compressor pressure ratio, and an engine response pressure which reflects the condition of compressor operation at any given engine operating condition.

The foregoing and other objects and advantages will become apparent in view of the following description taken in conjunction with the drawings, wherein:

Figure 1 is a block diagram showing a portion of the gas turbine engine and various components of the fuel control system operatively connected thereto;

Figure 3 is a curve chart illustrating the operating characteristics of the engine and the control device shown in Figures 1 and 2.

Figure 2:
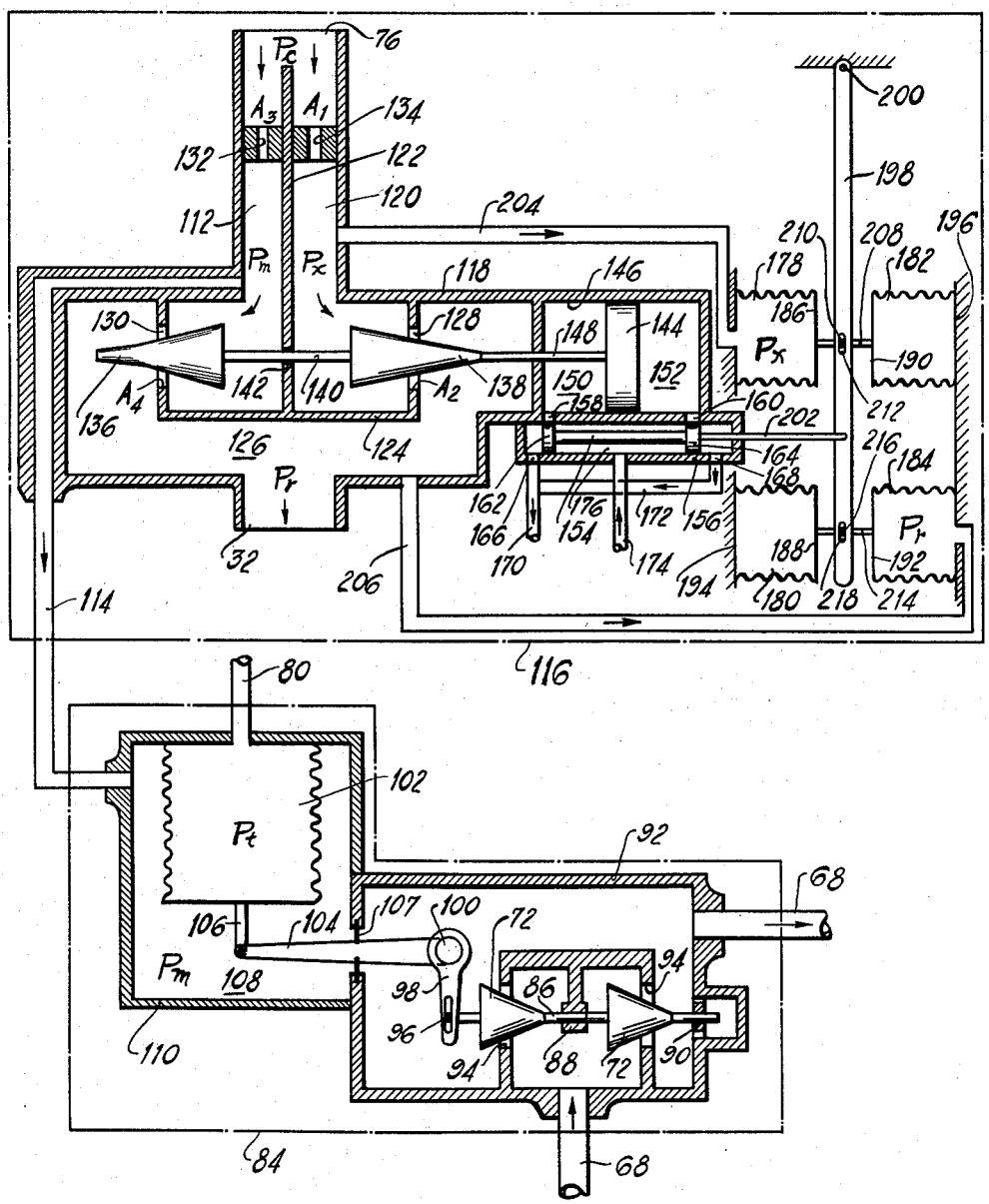
Figure 2 is a schematic diagram showing the various components which make up my compressor stall control.

Referring now to Figure 1, a gas turbine engine is generally indicated at 10; it includes a series of combustion chambers 11 mounted in a casing having an air intake section 12. A dynamic compressor is indicated at 13; it is shown as of the axial flow type, driven by means of the turbine 14 through the drive shaft 15. Each of the combustion chambers is provided with a burner nozzle 16, to which metered fuel is supplied under pressure by way of a fuel manifold 17 and individual fuel lines 18.

Fuel is supplied under pressure to the manifold 17 from a source, not shown, through a conduit 20, a pressurizing pump 22, which may be of the positive displacement by-pass type, and a conduit 24. A pump by-pass regulator device 26 is disposed in a first pump by-pass conduit 28 and is vented to compressor inlet pressure $P_r$ through conduits 30 and 32 for varying the effective fuel flow capacity from the pump and by-pass system in proportion to compressor inlet pressure; the by-pass regulator 26 is normally open to by-pass fuel to pump inlet conduit 20 in varying amounts, as required, during all conditions of engine operation. An engine driven all-speed governor unit, generally illustrated at 34, controls a normally open engine speed governor valve 36 which controls the flow of fuel through a second pump by-pass conduit 38 as necessary to govern the engine to any selected speed within the operating range thereof. The governor control means for valve 36 comprises a constant rate governor spring 40 mounted to urge said valve in a closing direction and opposed in such action by the force output of engine driven centrifugal weights 42, operable through levers 44 and 46, a flange 48 and a valve stem 50 to exert a force on the valve 36 in a valve opening direction which varies in proportion to the square of engine speed. The pilot control lever member 52 is mounted to impose selected degrees of compression on governor spring 40 through a plate member 54; if a higher selected engine speed is demanded by the pilot, valve 36 moves in a closing direction as a result of rotation of lever 52 in a counterclockwise direction and remains in a closed position until such time as weights 42 exert an increased force as a result of engine acceleration to overcome the force output of spring 40 and open valve 36, whereby fuel is by-passed from discharge conduit 24 to inlet conduit 20 through conduit 38, and the engine governs to selected speed.

If desired, a variable displacement pump of the swash plate type may be substituted for the by-pass type pump 22, in which instance the pump output would be directly controlled as a function of compressor inlet pressure and engine speed thereby eliminating the by-pass regulator device 26 and the all-speed governor 34, as illustrated in their respective by-pass conduits 28 and 38. A particular type of variable displacement pump having engine governor and inlet pressure controls therefor is disclosed and claimed in the copending U.S. application of Howard J. Williams, Serial No. 205,910, filed January 13, 1951 (common assignee), now abandoned.

The flow of fuel through a third pump by-pass conduit 56 is controlled by a normally closed regulator valve 58 which is the controlled element of a turbine temperature regulator unit generally shown at 60. The turbine temperature regulator unit 60 is adapted to limit the temperature at the inlet to the turbine 14 to a maximum predetermined quantity by controlling the position of the valve 58 in by-pass conduit 56 as a function of, for example, a comparison between a reference voltage which is indicative of a desired maximum turbine inlet temperature and a voltage produced at a thermocouple 62 disposed immediately upstream of the turbine 14 and connected to the regulator 60 through lead lines 64 and 66, said thermocouple voltage being indicative of existing turbine inlet temperature. A temperature regulator which may be readily adapted to control a maximum turbine inlet temperature is disclosed and claimed in the copending U.S. application of Lyle Martin, Serial No. 367,045, filed July 9, 1953 (common assignee), now Patent No. 2,841,330.

The flow of fuel through a fourth pump by-pass conduit 68 is controlled by a compressor stall regulator device generally illustrated at 70, which comprises the main subject matter of my invention and which is illustrated in detail in Figure 2. The stall regulator 70 includes a normally closed fuel regulator valve 72 which is adapted to open the by-pass conduit 68 in a controlled manner whenever a condition of compressor stall is imminent. The stall regulator communicates with compressor inlet pressure $P_r$ through the conduit 32 and total pressure pick-up 74, with compressor discharge pressure $P_c$ through a conduit 76 and a total pressure pick-up 78, and with a pressure $P_t$ existing within the compressor 13 through a conduit 80 and a pressure pick-up 82.

Referring now to Figure 2, the stall regulator metering valve 72 and the associated control therefor is generally shown at 84; the stall metering valve 72 is shown as a reciprocable tandem type double seated valve having an axially disposed stem 86 supported by bearing members 88 and 90 which are disposed within a valve housing 92, said tandem type stall valve being adapted to control the effective metering area of parallel metering restrictions 94 and connected at 96 to a slotted lever member 98 which is pivotally secured on a rotatable shaft 100 in turn suitably connected to an expansible bellows member 102 by a lever 104 and a bellows stem 106. A sealing diaphragm 107 of resilient material is connected to the lever 104 and the housing 92. The bellows 102 is disposed in a chamber 108 of a bellows housing 110 and is anchored at one end thereof on said housing and movable at the opposite end thereof for controlling the effective metering position of the valve 72. Exteriorly, bellows 102 responds to a modulated pressure $P_m$ contained within the chamber 108 which communicates with a passage 112 in which said pressure $P_m$ is modulated, by way of a conduit 114, whereas said bellows interiorly communicates with the variable pressure $P_t$ existent at a preselected stage of the compressor 13 through the conduit 80. The effective flow regulating position of valve 72 is therefore always a function of the relationship between modulated pressure $P_m$ and compressor pressure $P_t$. The modulated pressure $P_m$ is controlled to vary directly as compressor inlet pressure $P_r$ times a predetermined function of compressor pressure ratio $$\frac{P_c}{P_r}$$

A control mechanism which is adapted to vary $P_m$ in the desired manner is shown generally at 116 and may be referred to as a pressure generator which modulates a first fluid pressure to vary as a second fluid pressure times a predetermined function of a pressure ratio, hereinafter referred to as a pressure generator. The pressure generator 116 is disclosed and claimed in my copending U.S. application Serial No. 388,293, filed October 26, 1953, now Patent No. 2,848,869 which is assigned to the assignee of the present application.

The pressure generator includes a main valve housing 118 which is connected at the one end thereof to the conduit 76 at compressor discharge pressure and at the opposite end thereof to conduit 32 at compressor inlet pressure; conduit 76 communicates with conduit 32 through the passage 112, a passage 120 in parallel therewith, and a chamber 126, said parallel passages being formed within the control housing 118 by a web section 122 and a control orifice housing 124. Two control orifices 128 and 130 having variable effective areas $A_2$ and $A_4$ respectively, are formed within housing 124 and constitute a portion of the passages 120 and 112 respectively. The passage 112 contains a calibrated restriction 132 having a fixed area $A_3$ and the passage 120 contains a restriction 134 having a fixed area $A_1$. The effective area of the orifice 130 is controlled by a contoured valve member 136 which is rigidly connected to a second contoured valve member 138, adapted to control the effective area of orifice 128, by means of a reciprocable rod 140 which passes through a pressure sealed aperture 142 in the web section 122. The valves 136 and 138 are positionally controlled by a servo-motor member 144 reciprocably disposed within a cylinder 146 and rigidly connected to the valve 138 by a rod 148. The member 144 forms chambers 150 and 152 on either side thereof and is positionally controlled within the cylinder 146 by a servo or pilot valve 154 which is reciprocably disposed within a servo valve cylinder 156 having control ports 158 and 160 suitably positioned with respect to servo valve lands 162 and 164 respectively, and drain ports 166 and 168 connecting the closed ends of cylinder 156 to low pressure interconnected drain lines 170 and 172 respectively, said drain lines being in communication with the pump inlet low pressure supply conduit 20 (Figure 1). A high pressure servo fluid supply conduit 174 connects a servo valve chamber 176 to conduit 24 at pump discharge pressure.

A bank of bellows 178, 180, 182 and 184, having movable ends 186, 188, 190 and 192 respectively and anchored to the facing abutments 194 and 196, as shown, are conjointly operable to control the servo valve 154, and therefore member 144 and valves 136 and 138, by means of a suitable connection to a lever member 198 which is fulcrumed at 200 and connected to the servo valve by a stem or rod 202. All said bellows are preferably disposed in a chamber which is vented to the atmosphere, the bellows 180 and 182 being internally evacuated to cancel out the effect of changes in atmospheric pressure on the operation of the bellows 178 and 184. The bellows 178 communicates with conduit 120 at pressure $P_x$ through a passage 204, whereas bellows 184 communicates with chamber 126 at pressure $P_r$ through a passage 206. The movable ends of bellows 178 and 182 are connected to the lever 198 by means of a rigid member 208 and a pin 210 disposed in a slotted section 212 of said lever, while the movable ends of bellows 180 and 184 are similarly connected to the lever 198 by means of a member 214 and a pin 216 which is disposed in a second slotted section 218 of said lever.

That portion of the pressure generator 116 just described which includes the bank of bellows vented as shown and the operative connection of said bellows to the control valve 138 may be referred to as a pressure ratiometer and is disclosed and claimed in the copending U.S. application of Robert G. Rose, Serial No. 386,362, filed October 15, 1953 (common assignee), now Patent No. 2,858,700.

*Operation*

The control valve 138 is controlled by the servo mechanism hereinbefore described in such a manner that the ratio of the pressure drop across orifice 128

$$\left(\frac{P_x}{P_r}\right)$$

is maintained at a predetermined constant value, whereby the position of valve 138 relative to the orifice 128 (and therefore the position of control valve 136) is a predetermined function of the compressor pressure ratio $$\left(\frac{P_c}{P_r}\right)$$

It has been found that (see the copending application of Robert G. Rose, supra) with two restrictions in series, such as restrictions 134 and 128, in a conduit which is vented at one end thereof to a source of variable high fluid pressure ($P_c$) and at the opposite end thereof to a source of variable low fluid pressure ($P_r$), control of the ratio of fluid pressures across the second series restriction to a substantially constant value results in the ratio of the areas $$\frac{A_2}{A_1}$$

being equal to and variable only as a predetermined function of the ratio of the pressures $$\frac{P_c}{P_r}$$

Referring to the legend of the drawings, this relationship may be expressed in the following form:

$$\frac{A_2}{A_1} = f\left(\frac{P_c}{P_r}\right)$$

when $$\left(\frac{P_x}{P_r}\right)$$

equals a constant.

This relationship has been utilized in the design of the pressure generator 116 which continuously measures a function of the ratio of the pressures $P_c$ and $P_r$, irrespective of variations in either $P_c$ or $P_r$, by controlling the area $A_2$ of orifice 128 in such a manner that $$\left(\frac{P_x}{P_r}\right)$$

is maintained constant at all times; the displacement of servo motor member 144 and valves 136 and 138 is therefore a predetermined function of the compressor pressure ratio, which measured function may be varied as desired by varying the contour of valve 138. In other words, one particular function of compressor ratio is proportional to area $A_2$ and the displacement of valve 138 may be varied as desired by varying its contour while a second and different predetermined function of compressor ratio is proportional to area $A_4$ and may be varied as desired by recontouring the valve 136, so that at any given compressor ratio the desired compressor stall function thereof is reflected in the value of the ratio $$\frac{P_m}{P_r}$$

To effect this mode of operation each of the bellows 178, 180, 182 and 184 is shown as having the same effective area whereby the controlled constant pressure ratio $$\left(\frac{P_x}{P_r}\right)$$

is proportional to the ratio of the moment arms of bellows 184 and 178 about the fulcrum 200. The particular desired value of the pressure ratio $$\left(\frac{P_x}{P_r}\right)$$

for any given installation is selectable and may, for example, be varied as desired by changing the ratio of said moment arms and/or the area ratio of bellows 178 and 184. If, with the illustrated arrangement, the all-speed governor 34 is set by the pilot to a higher selected speed, fuel flow to the engine will immediately increase initiating acceleration thereof and pressure $P_c$ will increase at a rate which is a function of engine speed and the existent pressure and temperature conditions in the inlet section of the compressor 13. During acceleration of the engine, pressure $P_x$ tends to increase but the bellows 178, which is responsive to any increment of change therein, momentarily overcomes the bellows 184 and moves lever 198 out of its equilibrium position thereby moving the servo valve 154 rightwardly which vents chambers 152 and 150 to the high pressure fuel in conduit 174 and to drain or pump inlet pressure in conduit 170 respectively, whereby the servo motor member 144 moves leftwardly to increase area $A_2$ and decrease control pressure $P_x$ to reestablish equilibrium of the bank of bellows and to reset the servo valve 154 to neutral position. Whenever the servo valve 154 is in a neutral position the areas $A_2$ and $A_4$ are fixed. Since the area $A_2$ is controlled by the valve 138 it is apparent that the linear displacement of both valves 138 and 136 is equal to a function of the compressor ratio $$\left(\frac{P_c}{P_r}\right)$$

If the pressure $P_c$ should decrease for any reason, as during an engine deceleration, the reverse of the foregoing mode of operation occurs and a new and lesser ratio $$\frac{A_2}{A_1}$$

is established. Likewise, an increase or decrease in the pressure $P_r$ will momentarily upset the equilibrium of the servo mechanism resulting in a resetting of the valve 128 in such a manner that the pressure ratio $$\frac{P_x}{P_r}$$

is maintained constant. From the above it is also apparent that any simultaneous change in pressures $P_c$ and $P_r$, in the same or opposite senses, results in an actuation and control of the servo valve 154 which repositions valve 138 in such a manner that the pressure ratio $$\frac{P_x}{P_r}$$

is always maintained at a substantially constant and predetermined value.

From the foregoing it is apparent that, at any given pressure $P_r$, control or modulated pressure $P_m$ will vary in accordance with a preselected function of compressor pressure ratio. Since passage 112 at pressure $P_m$ communicates with conduit 32 at pressure $P_r$ through orifice 130, it is also apparent that the level of pressure $P_m$, at any given compressor ratio, is a function of altitude which may be expressed in terms of compressor inlet pressure $P_r$. In other words, modulated pressure $P_m$ is equal to the quantity $$P_r \cdot f\left(\frac{P_c}{P_r}\right)$$

which quantity may be chosen to define the compressor stall characteristic of any given engine when transiently operating at any given speed.

The pressure probe 82 is geometrically positioned within the compressor 13 with respect to the direction of air flow therethrough in such a manner that pressure $P_t$ reflects a measure of engine speed (N) and/or air flow ($W_a$) and the pressure ratio $$\frac{P_t}{P_r}$$

reflects a predetermined function of corrected speed $$\left(\frac{N}{\sqrt{\theta}}\right)$$

$$\left(W_a \frac{\sqrt{\theta}}{\delta}\right)$$

where $\theta$ is the ratio of actual compressor inlet temperature to standard inlet temperature at sea level and $\delta$ is the ratio of actual compressor inlet pressure to standard pressure at sea level. Since the selected position of the $P_t$ pressure probe 82 is such that $P_t = P_m$ or $$P_r \cdot f\left(\frac{P_c}{P_r}\right)$$

at incipient compressor stall it is apparent that $$\frac{P_t}{P_r} = f\left(\frac{P_c}{P_r}\right)$$

at incipient stall. The later relation is illustrated in the curve chart of Figure 3 by an incipient stall curve. An engine steady state operating curve is also shown in Figure 3.

Since the fuel control computed stall function of compressor ratio is measured by the modulated pressure $P_m$ it is apparent that, on the coordinates of Figure 3, the fuel control output.

$$\frac{P_m}{P_r}$$

will always fall along the incipient stall curve. For example, at any given compressor ratio, as illustrated by the line $a$—$b$—$c$, the computed control output $$\frac{P_m}{P_r}$$

will always be at point $b$ on the stall line irrespective of whether the engine is being accelerated, decelerated, or is operating at a steady state condition. The pressure ratio $$\frac{P_t}{P_r}$$

on the other hand, always reflects a measure of actual engine output or engine response. For example, if the engine be operating at the assumed compressor ratio in a steady state condition the engine output $$\frac{P_t}{P_r}$$

is illustrated at point $c$ which obviously is a condition of surge-free operation; at said steady state operating condition it is apparent that engine output pressure $P_t$ is greater than the control computed pressure $P_m$. If an engine acceleration is initiated from point $c$, $P_t$ immediately decreases and approaches $P_m$ at point $b'$; as $P_t$ approaches $P_m$ the normally closed stall regulator valve 72 begins to open and by-pass fuel from the nozzle supply conduit 24 to pump inlet conduit 20 in such a manner that fuel flow to the engine is inherently regulated to produce an acceleration characteristic which generates an engine response pressure $P_t$ nearly equal to the control computed stall function pressure $P_m$, so long as the engine is permitted to accelerate at the compressor stall limit. Acceleration therefore proceeds along the dotted line from point $b'$ to some point $d$ and the engine is then governed to point $e$ by the speed governor 34, said latter point being illustrative of a new pilot selected condition of engine power operation at steady state.

By proper design of a pressure generator or equivalent control computing device, a control parameter is producible which always reflects that particular function of compressor ratio indicative of the incipient stall characteristic of the compressor; by comparing said control parameter with a second engine response parameter judiciously selected to always be equal to said control parameter at the condition of incipient stall, a stall fuel valve may be controlled to regulate accelerating fuel flow to any compressor type jet engine so that the engine accelerates at the stall limit.

If, for any given engine, the maximum allowable turbine inlet temperature were an imposed limitation on the maximum allowable acceleration rate of the engine through a portion of the speed range thereof, in which range compressor stall would not be a limiting factor, the turbine temperature regulator 60 (Figure 1) would by-pass fuel as required to maintain said maximum turbine temperature whenever the engine were accelerated through said speed range. Whenever, throughout the accelerating range of any given engine, the compressor stall characteristic limits the maximum allowable acceleration rate, the normally closed stall valve 72 opens as necessary to produce optimum rate of engine acceleration at said limit, whereas whenever turbine temperature limits said rate the stall valve 72 closes and the normally closed temperature regulating valve 58 opens as necessary to regulate engine fuel flow so that the maximum allowable turbine temperature will not be exceeded. Thus, normal override action is inherent in this type of arrangement.

Any circuit element may be omitted without basically affecting control operation since only one element is normally operative at a time. For example, the temperature or stall regulator may be omitted if turbine temperature or stall will not be a problem. For turbo-prop engines, the all-speed governor 34 may be replaced by a suitable fuel valve, in which instance engine speed would be controlled by a propeller governor. Furthermore, with the arrangement as illustrated in Figure 1, each component circuit can be improved or replaced by other versions without requiring complete control system redesign. For example, the stall regulator herein described can be replaced by the compressor stall sensor disclosed in the copending U.S. application of Rudolph Bodemuller, Serial No. 357,661, filed May 27, 1953 (common assignee).

The by-pass regulator unit 26 operates to by-pass increasing quantities of fuel through conduit 28 with increasing altitude. It is apparent that, if the by-pass regulator unit and associated conduit 28 were absent, the sensitivity or gain of each of the other circuit valves would vary considerably with variations in engine inlet conditions since, at altitude, said circuit valves would be handling the major portion of the fuel pump output. The sensitivity or gain of the control system under ram and altitude changes is therefore controlled by suitable pressure bias on the by-pass regulator 26 such that the effective capacity of the pump system per engine r.p.m. is proportional to compressor inlet pressure $P_r$.

In the interest of structural simplicity and maximum lucidity in the presentation of the operating principles of the applicant's control system, only one embodiment thereof has been shown and described; however, it will be apparent to persons skilled in the art that various changes in form and relative arrangement of parts may be made to suit requirements. For example, the servo mechanism which includes the bank of bellows for controlling actuation of the valves 136 and 138 is replaceable by a diaphragm or low spring rate bellows activator if the servo mechanism is found undesirable, whereas the bellows means 102 for controlling the position of the stall valve 72 is replaceable by a servo system if the bellows action is found inadequate, and the dynamic response characteristic of control valves 136 and 138 may be improved by application of known servo-mechanism techniques to the servo mechanism which controls said valves. Also, control valves 136 and 138, if properly contoured, may control upstream orifices in the respective parallel passages of the two series orifices in each passage so long as the pressure ratio $$\frac{P_x}{P_r}$$

is maintained substantially constant. In addition, it may be found desirable in some installations to vary pressure $P_m$ according to some predetermined stall function of compressor ratio by direct measurement of a given fraction thereof, in which instance the total pressure pickups 78 and 74 would not be positioned, as shown, at the discharge and inlet side of the compressor 13 respectively but might, for example, be positioned to pick up the total pressure at the discharge sides of the sixth and second compressor stages respectively. Also, it may be found desirable in certain installations to utilize a dual pressure probe arrangement for picking up pressure $P_t$ wherein one of said probes would be directed tangentially to reflect engine speed parameter and the other directed axially to reflect the air flow parameter, whereby the resultant pressure $P_t$ would be a measure, in effect, of velocity triangles within the compressor. Furthermore, it may prove desirable to incorporate two or more signals, such as engine speed, compressor stall, and/or turbine inlet temperature, on a single fuel valve, with suitable signal blocks and relative gains such as to obtain satisfactory override action during transients from one controlling signal to another, to facilitate compactness; such a single fuel valve may preferably be located in series with the fuel pump for direct throttling action on the fuel supply.

I claim:

1. In a fuel control system for gas turbine engines having a burner and a compressor, means for controlling the flow of fuel to the burner comprising fuel flow regulating valve means, means responsive to first and second fluid pressures for controlling said valve means, means for continuously modulating said first fluid pressure during operation of the engine in such a way that said pressure effectively measures a predetermined function of compressor pressure ratio, and means including the compressor for generating said second fluid pressure to also vary as a predetermined function of compressor pressure ratio.

2. In a fuel control system for gas turbine engines having a burner and a compressor, means for controlling the flow of fuel to the burner comprising fuel flow regulating valve means, means responsive to a first fluid pressure and to a second fluid pressure for controlling said valve means, control means for continuously varying said first fluid pressure during operation of the engine in such a manner that said pressure effectively measures a predetermined function of the ratio of pressures across the compressor, and means associated with the compressor sensible to said second fluid pressure which also varies as a predetermined function of the ratio of pressures across the compressor.

3. In a fuel control system for gas turbine engines having a burner and a compressor, means for controlling the flow of fuel to the burner comprising a fuel flow regulating valve means, means responsive to first and second fluid pressures for controlling said valve means, computing means for continuously varying said first fluid pressure during operation of the engine in such a manner that said pressure continuously reflects a predetermined stall function of the ratio of pressures across the compressor, means operatively connected to a preselected stage of the compressor in such a manner that said latter means is sensible to said second fluid pressure which also varies as a predetermined stall function of compressor pressure ratio, and means communicating said latter means with said pressure responsive means.

4. In a fuel control system for gas turbine engines having a burner and a compressor, means for controlling the flow of fuel to the burner comprising a fuel flow regulating valve means, a pressure responsive means operatively connected to said valve means for controlling the flow regulating function thereof, a pressure computing means connected to the compressor for continuously modulating a first fluid pressure to vary as a predetermined stall function of compressor ratio, means communicating said pressure responsive means with said first fluid pressure, means operatively connected to a preselected stage of the compressor perceptive to a second fluid pressure generated within said compressor stage which also varies as a predetermined stall function of compressor ratio, and means communicating said pressure responsive means with said second fluid pressure.

5. In a fuel control system for gas turbine engines having a burner and a compressor, means for controlling the flow of fuel to the burner comprising fuel flow regulating valve means, a pressure computing means connected to the compressor for continuously modulating a first fluid pressure to vary as a predetermined stall function of compressor ratio, means geometrically positioned within a preselected stage of the compressor in such a manner that a second fluid pressure generated within said compressor stage which varies as a function of an engine operating parameter is perceived, and pressure responsive means sensible to said first and second fluid pressures for controlling the flow regulating position of said valve means, said pressure responsive means being adapted to effectively compare said first and second fluid pressures in such a way that said valve means is controlled to vary the flow of fuel to the burner so that the engine accelerates at or near the compressor stall limit.

6. In a fuel control system for gas turbine engines having a burner and a compressor, means for controlling the flow of fuel to the burner comprising fuel flow regulating valve means for controlling the flow of fuel to the burner in such a manner that the engine may be accelerated at or near the compressor stall limit, and control means operatively connected to said valve means including means responsive to first and second fluid pressures, a pressure ratiometer for continuously modulating said first fluid pressure including a conduit connectable to a source of relatively high pressure fluid in the compressor and to a source of relatively low pressure fluid in the compressor, said pressure ratiometer being operable to vary said first fluid pressure as a predetermined stall function of compressor pressure ratio, and means connected to a source of intermediate pressure fluid in the compressor and to said fluid pressure responsive means and geometrically positioned within a preselected stage of the compressor in such a manner that said second fluid pressure, which also varies as a predetermined stall function of compressor pressure ratio, is perceived.

7. In a fuel control system for gas turbine engines having a burner and a plural stage compressor, means for controlling the flow of fuel to the burner comprising fuel flow regulating valve means for controlling fuel flow so that the compressor is acceleratable at or near the stall limit thereof, pressure responsive means operatively connected to said valve means and responsive to the difference between a modulated fluid pressure and a compressor generated fluid pressure, computing means connected across two compressor stages for continuously modulating said first mentioned fluid pressure to vary as a predetermined stall function of compressor pressure ratio, and passage means connected to said pressure responsive means and to a preselected stage of the compressor for communicating said compressor generated pressure to said pressure responsive means, said opposite end of the passage means being geometrically positioned within the compressor in such a manner that said compressor generated pressure reflects a predetermined stall function of corrected engine speed and/or corrected air flow, whereby an engine acceleration tends to equalize said compressor generated pressure with said modulated pressure and said valve means tends to regulate the flow of fuel to accelerate the engine at the compressor stall limit.

8. In a fuel control system for gas turbine engines having a burner and a compressor, a fuel conduit for conducting metered fuel to the burner, pump means in said conduit for supplying metered fuel under pressure to the burner, a by-pass conduit connecting the discharge side of said pump to the inlet side thereof, compressor stall regulator valve means in said by-pass conduit for controlling the flow of fuel therethrough, means responsive to first and second fluid pressures for controlling the flow regulating position of said valve means, computing means for varying said first fluid pressure during operation of the engine in such a way that said pressure continuously reflects a stall function of the ratio of pressures across the compressor, and means including the compressor for generating said second fluid pressure to also vary as a function of the ratio of pressures across the compressor, said second fluid pressure acting in opposition to said first fluid pressure such that the flow regulating function of said valve means is controlled to accelerate the engine at or near the compressor stall limit whenever said second fluid pressure is substantially equal to said first fluid pressure.

9. In a fuel control system for gas turbine engines having a burner and a compressor, a fuel conduit for conducting metered fuel to the burner, pump means in said conduit for supplying metered fuel under pressure to the burner, a pump by-pass conduit for conducting fuel from the discharge side of said pump to the inlet side thereof, valve means in said by-pass conduit for controlling the flow of fuel therethrough such that the engine accelerates at or near the compressor stall limit, and control means operatively connected to said valve means for effecting the compressor stall regulating function thereof including means responsive to first and second fluid pressures, pressure ratiometer means for continuously modulating said first fluid pressure during operation of the engine in such a way that said pressure continuously reflects a stall function of the ratio of pressures across the compressor, and means operatively connected to a preselected stage of the compressor sensible to said second fluid pressure which also varies as a stall function of compressor pressure ratio.

10. In a fuel control system for gas turbine engines having a burner and a compressor, a fuel conduit for conducting metered fuel to the burner, pumping means in said conduit for supplying metered fuel under pressure to the burner, a by-pass conduit for conducting fuel from the discharge side of said pump to the inlet side thereof, a normally closed flow restriction in said by-pass conduit, valve means for variably opening said restriction to regulate the flow of fuel therethrough as required to accelerate the engine at or near the compressor stall limit, a pressure responsive means operatively connected to said valve means for controlling the stall regulating function thereof, a pressure computing means connected to the compressor for continuously modulating a first fluid pressure to vary as a predetermined stall function of compressor ratio, means communicating said pressure responsive means with said first fluid pressure, means operatively connected to a preselected stage of the compressor perceptive to a second fluid pressure generated within said compressor stage which also varies as a predetermined stall function of compressor ratio, and means communicating said pressure responsive means with said second fluid pressure, said pressure responsive means being adapted to effectively compare said first and second fluid pressures in such a manner that said valve means is actuated in an opening direction whenever said second fluid pressure quantitatively approaches said first fluid pressure.

11. In a fuel control system for gas turbine engines having a burner and a compressor, a fuel passage for conducting metered fuel to the burner, pump means in said passage for supplying fuel under pressure to the burner, a first pump by-pass conduit, fuel flow regulating means in said conduit responsive to turbine temperature and adapted to control the flow of fuel to the burner during acceleration of the engine so as to maintain said turbine temperature within a predetermined maximum value, a second pump by-pass conduit, valve means in said second conduit for controlling fuel flow therethrough, means responsive to the differential between first and second compressor generated fluid pressures for controlling the flow regulating function of said valve means, and means responsive to the compressor pressure ratio for modifying said first fluid pressure such that said pressure varies as a predetermined stall function of the compressor pressure ratio, said second fluid pressure being an unmodified compressor pressure which also varies as a function of the compressor pressure ratio, said valve means being operative to regulate fuel flow and thus the acceleration of an engine at or near the compressor stall limit whenever said second fluid pressure quantitatively approaches said first fluid pressure.

12. In a fuel control system for gas turbine engines having a burner and a compressor, a main fuel passage for conducting metered fuel to the burner, pumping means in said passage for supplying metered fuel under pressure to the burner, and pump by-pass means for controlling the supply of metered fuel to the burner such that the acceleration rate of the engine follows predetermined limits, including turbine temperature responsive means for controlling turbine temperature to a predetermined maximum value, compressor stall regulator valve means, pressure responsive means sensible to first and second fluid pressures for controlling the flow regulating function of said valve means, and means for modulating said first fluid pressure during operation of the engine in such a way that said pressure reflects a predetermined stall function of the ratio of pressures across the compressor.

13. In a fuel control system for gas turbine engines having a burner and a compressor, a fuel passage for conducting metered fuel to the burner, pumping means in said passage for supplying metered fuel under pressure to the burner, a plurality of conduits for by-passing fuel from the discharge side of said pump means to the inlet side thereof, a normally closed regulator valve means in one of said by-pass conduits responsive to turbine temperature for regulating fuel flow to the burner as necessary to maintain an upper limit on turbine temperature during engine acceleration, a second normally closed regulator valve means in a second by-pass conduit responsive to first and second variable fluid pressures derived from separate sources in the compressor which vary as stall functions of compressor ratio for regulating the flow of fuel to the burner during acceleration of the engine such that the engine accelerates at or near the compressor stall limit, said first and second variable fluid pressures approaching a common value at or near the compressor stall limit, and a normally open engine speed governor means operatively associated with said main fuel passage for controlling the flow of fuel therethrough as necessary to govern the engine to any given pilot selected speed.

14. In a fuel control system for gas turbine engines having a burner and a compressor, means for controlling the flow of fuel to the burner comprising valvular means, means responsive to first and second fluid pressures for controlling said valvular means, a pressure ratiometer for modulating said first fluid pressure including a conduit connectable to a source of relatively high pressure fluid in the compressor and to a source of relatively low pressure fluid in the compressor, a flow restriction in said conduit, displaceable means controlling said restriction and mechanism controlling said displaceable means in such a manner that said first fluid pressure varies as a function of the ratio of the pressures across said high and low pressure sources, and means associated with the compressor sensible to said second fluid pressure which also varies as a function of the ratio of the pressures across said high and low pressure sources.

15. In a fuel control system for gas turbine engines having a burner and a compressor, means for controlling the flow of fuel to the burner comprising flow control valvular means, fluid pressure responsive means operatively connected to said valvular means, a pressure ratiometer for controlling a first fluid pressure to which said pressure responsive means responds including a conduit connectable to a source of high pressure fluid in the compressor and to a source of low pressure fluid in the compressor, a flow restriction in said conduit, valve means for controlling the effective area of said restriction, means for controlling the position of said valve means including servo mechanism operatively connected thereto in such a manner that a substantially constant predetermined pressure ratio is maintained across said flow restriction, whereby said first fluid pressure varies as a predetermined function of the ratio of pressures across said high and low pressure sources, and means operatively connected to a preselected stage of the compressor sensible to a second fluid pressure which also varies as a function of the ratio of pressures across said high and low pressure sources whenever the engine is accelerated at the compressor stall limit, and means communicating said second fluid pressure to said pressure responsive means.

16. In a fuel control system for gas turbine engines having a burner and a compressor, means controlling the flow of fuel to the burner comprising valvular means, means responsive to first and second fluid pressures for controlling said valvular means, a pressure ratio measuring device for controlling said first fluid pressure in accordance with a predetermined function of compressor ratio including a conduit connectable at one end thereof to a source of high pressure fluid in the compressor and at the opposite end thereof to a source of low pressure fluid in the compressor, a first flow restriction in said conduit, a second flow restriction in said conduit in parallel with said first flow restriction, connected first and second valve means for controlling the effective area of said first and second restrictions respectively and means responsive to the pressure ratio across one of said restrictions for controlling the area regulating position of said first and second valve means, and means geometrically positioned within a preselected stage of the compressor in such a manner that said second fluid pressure is perceived and communicated to said pressure responsive means through said geometrically positioned means, said second fluid pressure being an effective measure of a predetermined stall function of corrected engine speed and/or corrected air flow.

17. In a fuel control system for gas turbine engines having a burner and a compressor, valvular means for regulating the flow of fuel to the burner, pressure responsive means operatively connected to said valvular means for controlling the flow regulating function thereof, means communicating a first fluid pressure to said pressure responsive means, means communicating a second fluid pressure to said pressure responsive means, means for modulating said first fluid pressure including a conduit connectable to a source of high pressure fluid in the compressor and at the opposite end thereof to a source of low pressure fluid in the compressor, parallel flow paths in said conduit, a flow restriction in each of said parallel paths, valve means for controlling each of said restrictions, and means for displacing said valve means as a predetermined function of the ratio of pressures across said high and low pressure sources whereby said valve means modulates said first fluid pressure as a predetermined function of said ratio, and means predeterminately positioned within a preselected stage of the compressor perceptive to said second fluid pressure which also varies as a predetermined function of said ratio.

18. In a fuel control device for a gas turbine engine having a burner and a compressor, means for controlling the fuel flow to the burner comprising fuel flow regulating valve means, air passage means connected between high and low air pressure sources at the compressor, and air pressure computer means controlling a modulated pressure in said air passage which is intermediate the pressures at said high and low pressure sources and which is controlled to vary as a function of the ratio of pressures at said high and low pressure sources for any given value of pressure at said low pressure source, means including the compressor for producing an air pressure which varies as a predetermined function of the ratio of pressures at said high and low pressure sources, and pressure responsive means operatively connected to said valve means for comparing said modulated and produced pressures.

19. In a fuel control device for a gas turbine engine having a burner and a compressor, means for controlling the fuel flow to the burner comprising fuel flow regulating valve means, air passage means connected between high and low pressure sources at the compressor, and air pressure computer means responsive to an air pressure ratio in said passage means for controlling a modulated pressure to vary as a predetermined compressor stall function of the ratio of pressures across the compressor, means for picking up an air pressure in the compressor which varies as a predetermined function of the ratio of pressures across the compressor, and means for comparing the last mentioned air pressure with said modulated pressure and operatively connected to said valve means for regulating the fuel flow to the burner to accelerate the engine at or near the compressor stall limit whenever said last mentioned air pressure approaches the value of said modulated pressure.

20. In a fuel control device for a gas turbine engine having a burner and a compressor, means for controlling the fuel flow to the burner comprising fuel flow regulating valve means, means for continuously controlling a first fluid pressure to vary as a compressor pressure times a predetermined function of compressor pressure ratio, means sensing a second fluid pressure which varies as some predetermined function of compressor pressure ratio, and means operatively connected to said valve means for comparing said first and second fluid pressures to regulate the flow of fuel to the burner.

21. In a fuel control device for a gas turbine engine having a burner and a compressor, means for controlling the fuel flow to the burner comprising fuel flow regulating valve means, control means continuously computing a modulated fluid pressure, and pressure responsive means operatively connected to said valve means and continuously comparing said modulated fluid pressure with a sensed fluid pressure generated by the compressor to regulate the flow of fuel to the burner whenever the sensed fluid pressure quantitatively approaches the modulated fluid pressure.

22. In a fuel control device for a gas turbine engine having a burner and a compressor, said compressor having a characteristic stall limitation, means for controlling the fuel flow to the burner comprising fuel flow regulating valve means, and means operatively connected to said valve means and responsive to only two fluid pressures derived from separate sources in the compressor, one of said fluid pressures being a modified compressor generated pressure and the other of said fluid pressures being an unmodified compressor generated pressure which become substantially equal at or near the stall limit of said compressor and cause said latter means to regulate said valve means to thereby reduce fuel flow to the burner.

23. In a fuel control device for a gas turbine engine having a burner and a compressor, means for controlling the fuel flow to the burner comprising fuel flow regulating valve means, air passage means connected between high and low air pressure sources at the compressor, and air pressure computer means controlling a modulated pressure in said air passage to vary as the pressure at said low pressure source times a function of the ratio of pressures at said high and low pressure sources, means including the compressor for producing an air pressure which varies as a predetermined function of the ratio of pressures at said high and low pressure sources, and means operatively connected to said valve means and responsive to said modulated pressure and to said produced pressure.

References Cited in the file of this patent

UNITED STATES PATENTS

| | | |
|---|---|---|
| 2,560,118 | Malone et al. | July 10, 1951 |
| 2,590,853 | Fulton | Apr. 1, 1952 |
| 2,641,105 | Drake | June 9, 1953 |
| 2,643,514 | Jubb | June 30, 1953 |
| 2,645,240 | Drake | July 14, 1953 |
| 2,657,530 | Lee | Nov. 3, 1953 |
| 2,667,743 | Lee | Feb. 2, 1954 |
| 2,668,414 | Lee | Feb. 9, 1954 |
| 2,670,599 | Davies et al. | Mar. 2, 1954 |
| 2,688,229 | Lee | Sept. 7, 1954 |
| 2,691,268 | Prentiss | Oct. 12, 1954 |
| 2,691,867 | Kendig | Oct. 19, 1954 |
| 2,711,073 | Atkinson | June 21, 1955 |
| 2,714,803 | Abild | Aug. 9, 1955 |
| 2,738,644 | Alford | Mar. 20, 1956 |
| 2,848,869 | Russ | Aug. 26, 1958 |
| 2,864,393 | Drake | Dec. 16, 1958 |

FOREIGN PATENTS

| | | |
|---|---|---|
| 520,732 | Belgium | July 15, 1953 |

(Corresponding Great Britain, 753,643, Aug. 24, 1955)